US010628653B2

(12) United States Patent
Zhang et al.

(10) Patent No.: US 10,628,653 B2
(45) Date of Patent: *Apr. 21, 2020

(54) METHOD AND APPARATUS FOR DETERMINING EXISTENCE OF FOREIGN MATERIAL ON SURFACE OF FINGERPRINT SENSOR OF TERMINAL

(71) Applicant: Guangdong Oppo Mobile Telecommunications Corp., Ltd., Dongguan, Guangdong (CN)

(72) Inventors: Qiang Zhang, Guangdong (CN); Lizhong Wang, Guangdong (CN); Haitao Zhou, Guangdong (CN); Kui Jiang, Guangdong (CN); Wei He, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,224

(22) Filed: May 21, 2018

(65) Prior Publication Data

US 2018/0268188 A1 Sep. 20, 2018

Related U.S. Application Data

(63) Continuation of application No. 15/895,241, filed on Feb. 13, 2018, which is a continuation of application No. PCT/CN2016/091802, filed on Jul. 26, 2016.

(30) Foreign Application Priority Data

Oct. 19, 2015 (CN) .......................... 2015 1 0681166

(51) Int. Cl.
*G06K 9/00* (2006.01)
*G06K 9/03* (2006.01)

(52) U.S. Cl.
CPC ............. *G06K 9/0002* (2013.01); *G06K 9/00* (2013.01); *G06K 9/033* (2013.01)

(58) Field of Classification Search
None
See application file for complete search history.

(56) References Cited

U.S. PATENT DOCUMENTS 9,691,315 B2 6/2017 Imai et al.
9,733,144 B2 * 8/2017 Miura .................. G01L 19/149
(Continued)

FOREIGN PATENT DOCUMENTS

CN 102221946 A 10/2011
CN 103793698 A 5/2014
(Continued)

OTHER PUBLICATIONS

International search report issued in corresponding international application No. PCT/CN2016/091802 dated Oct. 20, 2016.
(Continued)

*Primary Examiner* — Vikkram Bali
(74) *Attorney, Agent, or Firm* — Young Basile Hanlon & MacFarlane, P.C.

(57) ABSTRACT

A method and an apparatus for determining existence of a foreign material on a surface of a fingerprint sensor of a terminal are provided. The method includes the following. A current capacitance value of the fingerprint sensor of the terminal is obtained. A first difference between the current capacitance value and a preset capacitance reference value is calculated. Determine that the foreign material is present on the surface of the fingerprint sensor when the first difference is within a preset foreign-material threshold range. The preset capacitance reference value is a capacitance value tested with no foreign material on the surface of the fingerprint sensor before leaving the factory and is stored in a
(Continued)

system in advance. The preset foreign-material threshold range is set in advance according to experimental data of capacitance-change tests performed on the fingerprint sensor when different conductive foreign materials are on the surface of the fingerprint sensor.

8 Claims, 4 Drawing Sheets

(56) References Cited

U.S. PATENT DOCUMENTS

| | | |
|---|---|---|
| 2003/0133143 A1 | 7/2003 | McGlurg et al. |
| 2005/0123177 A1 | 6/2005 | Abiko |
| 2007/0222010 A1 | 9/2007 | Chou et al. |
| 2010/0013784 A1 | 1/2010 | Nashiki et al. |
| 2011/0210927 A1 | 9/2011 | Mizuhashi et al. |
| 2015/0070079 A1* | 3/2015 | Yang ................ G06K 9/0002 327/517 |
| 2015/0071648 A1* | 3/2015 | Hong ................ H04B 10/114 398/131 |
| 2016/0266717 A1* | 9/2016 | Oral ................ G06F 3/0418 |

FOREIGN PATENT DOCUMENTS

| | | |
|---|---|---|
| CN | 104965615 A | 10/2015 |
| CN | 105389542 A | 3/2016 |
| EP | 1220139 A2 | 7/2002 |
| EP | 1624412 A1 | 2/2006 |
| WO | 0124700 A1 | 4/2001 |
| WO | 2011108582 A1 | 9/2011 |

OTHER PUBLICATIONS

Extended European search report issued in corresponding European application No. 16856693.3 dated Jul. 12, 2018.

Office Action 1 issued in corresponding European application No. 16856693.3 dated Feb. 5, 2019.

* cited by examiner

METHOD AND APPARATUS FOR DETERMINING EXISTENCE OF FOREIGN MATERIAL ON SURFACE OF FINGERPRINT SENSOR OF TERMINAL

CROSS-REFERENCE TO RELATED APPLICATION(S)

This application is a continuation of U.S. Ser. No. 15/895,241, filed on Feb. 13, 2018, which is a continuation of International Application No. PCT/CN2016/091802, filed on Jul. 26, 2016, which claims priority to Chinese Patent Application No. 201510681166.9, filed on Oct. 19, 2015, the contents of all of which are hereby incorporated by reference in their entireties.

TECHNICAL FIELD

The present disclosure relates to the field of terminal technology, and particularly to a method and an apparatus for determining existence of a foreign material on a surface of a fingerprint sensor of a terminal.

BACKGROUND

As terminal technologies and image processing technologies advance, fingerprint recognition technology, as a high-security recognition technology, has been applied to many fields. The fingerprint recognition technology can bring security protection for individual private devices and is convenient for users. For example, terminals, application software or files of the terminal can be encrypted or decrypted (in other words, locked or unlocked) via the fingerprint recognition technology, to provide a better experience for the users.

The fingerprint recognition technology needs the user to touch a surface of a fingerprint sensor of the terminal with a finger, to acquire fingerprint information of the user. Inevitably, in a process of acquiring the fingerprint information of the user, water or other foreign materials (also known as a foreign object) may be present on the surface of the fingerprint sensor or the finger of the user. Methods for determining existence of a foreign material on a surface of a fingerprint sensor tend to be complicated without high accuracy.

DETAILED DESCRIPTION

Figure 1:
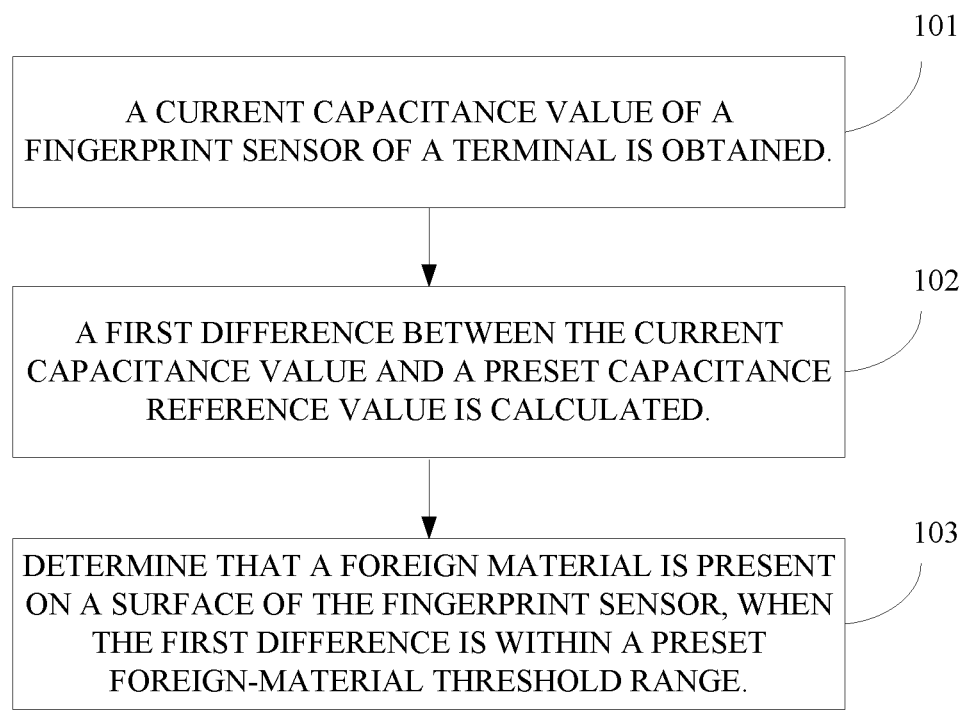
FIG. 1 is a flowchart illustrating a method for determining existence of a foreign material on a surface of a fingerprint sensor of a terminal according to a first implementation of the present disclosure.

To describe the objectives, technical solutions, and advantages of implementations of the present disclosure more clearly, the implementations of the present disclosure are further described in detail below with reference to the accompanying drawings. It should be noted that the implementations described herein are merely used to explain rather than to limit the present disclosure. In addition, to facilitate description, a part of contents related to the present disclosure rather than all the contents are illustrated in the accompanying drawings. Prior to interpreting the exemplary implementations in detail, it should be mentioned that some exemplary implementations are described as processes or methods depicted as a flowchart. Although various operations (or steps) in the flowchart are described as sequential processes, these operations can be performed in parallel, concurrently, or synchronously. Moreover, orders of these operations can be rearranged. The process may be terminated when the operation thereof is completed, and additional steps may not be included in the accompanying drawings. The processes may correspond to methods, functions, procedures, subroutines, subroutines, and the like.

In the following, some of the terms used herein are explained to facilitate the understanding for those skilled in the art.

Terminal

Terminal, also known as a terminal device, terminal equipment, or user equipment (UE), means an electronic device that provides voice and/or data connectivity to a user, examples of which can be hand-held devices with wireless connectivity function, on-board devices, or the like. Common terminals can be, for example, mobile phones, tablets, laptops, handheld computers, mobile internet devices (MID), or wearable equipment such as smart watches, smart bracelets, and pedometers or others. Terminals in the present disclosure are not limited to mobile terminals and common terminals, but can also be automated teller machines (ATM), ticket machines, entrance guard machines, medical equipment, or other terminals equipped with fingerprint recognition function.

Fingerprint Sensor

A fingerprint sensor, also known as a fingerprint recognition module or fingerprint recognition sensor, can realize the recognition of individual fingerprint features through a specific induction sensor. At present, the fingerprint recognition sensor is mainly divided into an optical fingerprint sensor, a capacitive fingerprint sensor, and a radio frequency (RF) fingerprint sensor. The fingerprint recognition sensor can be set in combination with a metal dome array (in other words, dome key) of a terminal, and can be set on the front surface, the race surface, or the side surface of the terminal, the present disclosure is not limited thereto. Similarly, the fingerprint recognition sensor can be set in combination with the touch screen of the terminal. For example, the fingerprint recognition sensor can be set below the touch panel of the touch screen.

In WO2011/108582 JA entitled "FOREIGN OBJECT DETERMINATION DEVICE, FOREIGN OBJECT DETERMINATION METHOD, AND FOREIGN OBJECT DETERMINATION PROGRAM", a foreign object determination scheme based on an image is provided. The present disclosure provides a new technical solution to determine foreign materials present on a surface of a fingerprint sensor based on capacitance values of the fingerprint sensor. In the method provided herein, a current capacitance value is obtained and compared with a reference capacitance value (hereinafter, referred to as preset capacitance reference value), and the terminal may determine whether or not there is a foreign material on the surface of the fingerprint sensor based on the comparison between the current capacitance value and the reference capacitance value.

First Implementation

FIG. 1 is a flowchart illustrating a method for determining existence of a foreign material on a surface of a fingerprint sensor of a terminal according to a first implementation of the present disclosure. The method can be executed by an apparatus for determining the existence of a foreign material on a surface of a fingerprint sensor. The apparatus can be implemented by software and/or hardware and can be embedded in a terminal as a part of the terminal. As illustrated in FIG. 1, the method of the implementation includes the following.

At block 101, a current capacitance value of the fingerprint sensor of a terminal is obtained.

The "terminal" referred to herein includes but is not limited to devices equipped with a fingerprint sensor, such as mobile phones, tablet computers, laptops, or the like.

In the implementation, a current state of the fingerprint sensor of the terminal can be a state of the fingerprint sensor before or after a user acts on (for example, touches or presses) the fingerprint sensor.

At block 102, a first difference between the current capacitance value and a preset capacitance reference value is calculated.

The preset capacitance reference value is obtained with no foreign material present on the surface of the fingerprint sensor before leaving the factory, and is stored in a system (such as a memory of the terminal) in advance.

At block 103, determine that the foreign material is present on or exist on the surface of the fingerprint sensor when the first difference is within a preset foreign-material threshold range.

When the foreign material is present on the surface of the fingerprint sensor, the foreign material may be on the surface of the fingerprint sensor, or left on the surface of the fingerprint sensor after the user touches the fingerprint sensor with the finger with the foreign material thereon.

In the implementation, the foreign material is conductive and therefore, whether the foreign material is present on the surface of the fingerprint sensor can be determined according to capacitance value changes of the fingerprint sensor. The foreign material includes but is not limited to water.

The preset foreign-material threshold range is set in advance according to experimental data of capacitance-change tests performed on the fingerprint sensor when different conductive foreign materials are present on the surface of the fingerprint sensor. The preset foreign-material threshold range can be determined according to different foreign materials on the surface of the fingerprint sensor in actual use.

In the case where the user touches the surface of the fingerprint sensor with a finger when no foreign material is present on the surface of the fingerprint sensor, the capacitance value change of the fingerprint sensor relative to the preset capacitance reference value will be large; on the contrary, the capacitance value change of the fingerprint sensor relative to the preset capacitance reference value will be small when the foreign material is present on the surface of the fingerprint sensor. When the difference between the current capacitance value of the fingerprint sensor and the preset capacitance reference value is within the preset foreign-material threshold range, determine that the foreign material is on the surface of the fingerprint sensor.

According to the method for determining the existence of the foreign material on the surface of the fingerprint sensor of the terminal of the first implementation, by detecting the difference between the current capacitance value of the fingerprint sensor and the preset capacitance reference value, whether the difference is within the preset foreign-material threshold range is determined. Then determine the foreign material is present on the surface of the fingerprint sensor, when the difference is within the preset foreign-material threshold range. In other words, whether the foreign material is present on the surface of the fingerprint sensor is determined according to the capacitance value change of the fingerprint sensor, thereby simplifying the operation of determining existence of the foreign material present on the surface of the fingerprint sensor of the terminal and improving the accuracy of determining existence of the foreign material present on the surface of the fingerprint sensor of the terminal.

Second Implementation

Figure 2:
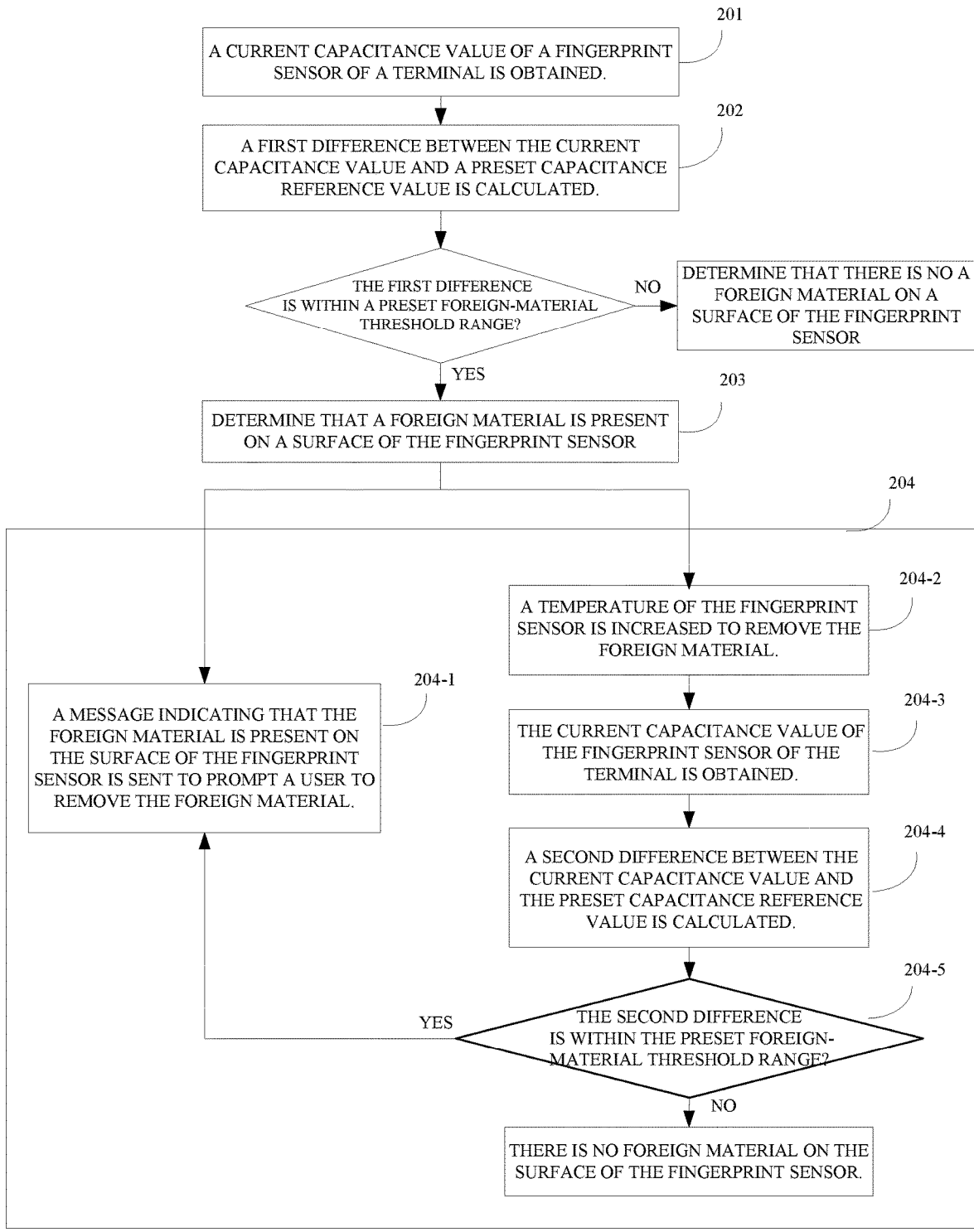
FIG. 2 is a flowchart illustrating a method for determining existence of a foreign material on a surface of a fingerprint sensor of a terminal according to a second implementation of the present disclosure.

FIG. 2 is a flowchart illustrating a method for determining existence of a foreign material on a surface of a fingerprint sensor of a terminal according to a second implementation of the present disclosure. The implementation is further optimized on the basis of the first implementation. In the implementation, the method may further include removing the foreign material in a preset manner after determining that the foreign material is present on the surface of the fingerprint sensor.

As illustrated in FIG. 2, the method of the implementation includes the following.

At block 201, a current capacitance value of the fingerprint sensor of the terminal is obtained. In actual practice, the current capacitance value can be obtained at preset intervals such as one hour, ten minutes, thirty seconds, and the like. The current capacitance value can even be obtained continuously, which may, however, cause power consumption problem. Alternatively, the obtaining of the current capacitance value can be triggered by a certain event, such as a press or touch operation on the fingerprint sensor by a user.

The term "current capacitance value" indicates a capacitance value of the fingerprint sensor in the current state, and is dynamically changed rather than fixed as time goes on. The "current capacitance value" mentioned at block 201 can be understood as "first current capacitance value" to be distinguished from the "current capacitance value" mentioned at block 204-3.

At block 202, a first difference between the current capacitance value and a preset capacitance reference value is calculated.

At block 203, if the first difference is within a preset foreign-material threshold range, determine that the foreign material is present on the surface of the fingerprint sensor. Otherwise, determine the surface of the fingerprint sensor with no foreign material.

At block 204, the foreign material is removed in a preset manner.

In one implementation, the foreign material can be removed by increasing temperature; in another implementation, the foreign material can be removed by informing the user to remove it, such as issue an alert. The present disclosure is not limited thereto.

Manner 1

As illustrated in FIG. 2 at block 204-1, the terminal may send a message or information indicating that the foreign material is present on the surface of the fingerprint sensor, so as to prompt a user to remove the foreign material.

The message sent to the user can be a text prompt message, a sound prompt message, or a combination of both, and the implementation is not limited thereto.

Manner 2

As illustrated in FIG. 2 at block 204-2, the foreign material can be removed by increasing a temperature of the fingerprint sensor.

The temperature of the fingerprint sensor can be improved in various ways. For example, the temperature of the fingerprint sensor can be increased by increasing a power of the fingerprint sensor. Or, the temperature of the fingerprint sensor can be increased by controlling a heating device corresponding to the fingerprint sensor to heat the fingerprint sensor.

The power of the fingerprint sensor can be increased at a constant rate or a step-changed rate. Likewise, the fingerprint sensor can be heated at a constant rate or a step-changed rate by controlling the heating device corresponding to the fingerprint sensor. The implementation of the disclosure is not limited thereto.

When a preset time has elapsed after increasing the temperature of the fingerprint sensor, the current capacitance value (can be referred to as "second current capacitance value" to be distinguished from the "current capacitance value" mentioned at block 201) of the fingerprint sensor of the terminal is obtained at block 204-3. A second difference between the current capacitance value and the preset capacitance reference value is then calculated at block 204-4. Then determine that the foreign material is present on the surface of the fingerprint sensor at block 204-5 when the second difference is within the preset foreign-material threshold range. Thereafter, the method proceeds to block 204-1, to send the message indicating that the foreign material is present on the surface of the fingerprint sensor, so as to prompt the user to remove the foreign material based on a determination that the foreign material is present on the surface of the fingerprint sensor.

The preset time can be set in advance according to the performance of heating the fingerprint sensor by the terminal. For example, if the foreign material on the surface of the fingerprint sensor is water and the water can be removed within 10 seconds by increasing the temperature of the fingerprint sensor, then a value of the preset time can be 10 seconds.

When the temperature of the fingerprint sensor has been increased for the preset time, determine whether the foreign material is on the surface of the fingerprint sensor. If the foreign material is on the surface of the fingerprint sensor, it means that increasing the temperature of the fingerprint sensor is not sufficient to remove the foreign material. Then the message indicating that the foreign material is present on the surface of the fingerprint sensor is sent, to prompt the user to remove the foreign material, thus ensuring that the foreign material on the surface of the fingerprint sensor can be removed completely.

If the foreign material on the surface of the fingerprint sensor is water, the water will be removed with the increasing of the temperature of the fingerprint sensor within the preset time. If the foreign material present on the surface of the fingerprint sensor is still detected after the preset time has elapsed, it indicates that the foreign material on the surface of the fingerprint sensor may be a foreign material that cannot be removed by increasing the temperature of the fingerprint sensor. The message indicating that the foreign material is present on the surface of the fingerprint sensor is then sent, so as to prompt the user to remove foreign material.

According to the method for determining existence of the foreign material on the surface of the fingerprint sensor of the terminal of the second implementation, whether the foreign material is present on the surface of the fingerprint sensor is determined based on capacitance value changes of the fingerprint sensor, therefore, the operation of determining existence of the foreign material present on the surface of the fingerprint sensor of the terminal can be simplified and the accuracy of determining existence of the foreign material present on the surface of the fingerprint sensor of the terminal can be improved. Moreover, the foreign material is removed in the preset manner, thus improving the fingerprint recognition rate of the fingerprint sensor.

Third Implementation

Figure 3:
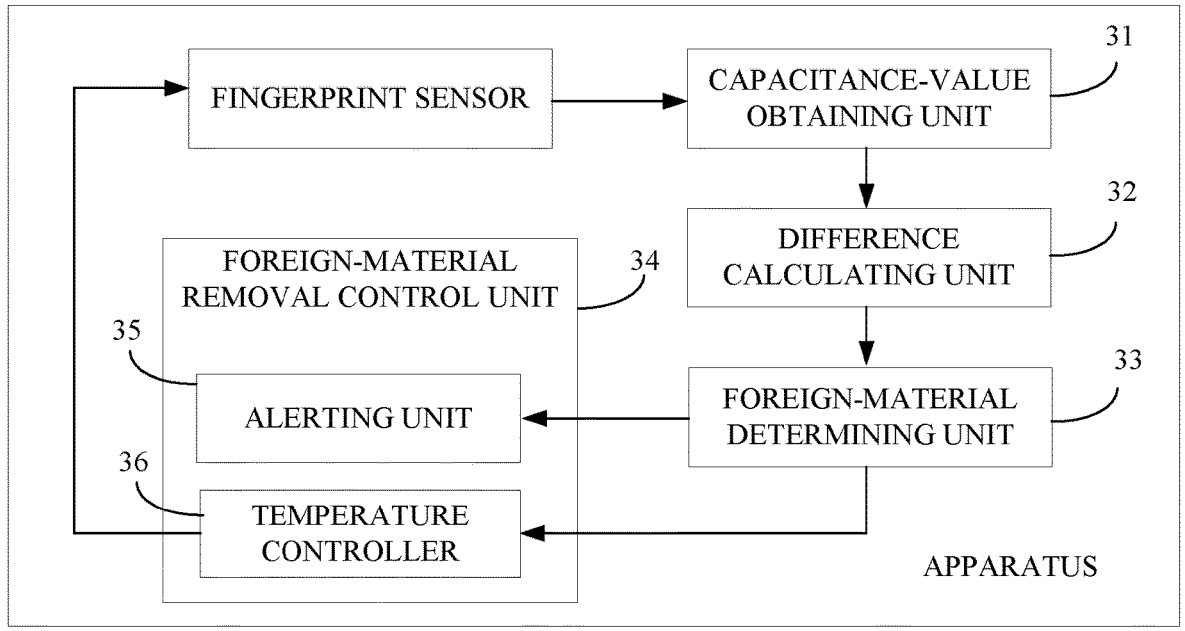
FIG. 3 is a schematic structural diagram illustrating an apparatus for determining existence of a foreign material on a surface of a fingerprint sensor according to a third implementation of the present disclosure.

FIG. 3 is a schematic structural diagram illustrating an apparatus for determining existence of a foreign material on a surface of a fingerprint sensor according to a third implementation of the present disclosure. As illustrated in FIG. 3, the apparatus of the third implementation includes a capacitance-value obtaining unit 31, a difference calculating unit 32, and a foreign-material determining unit 33. The capacitance-value obtaining unit 31 can be coupled with a fingerprint sensor.

The capacitance-value obtaining unit 31 can be a detector, a sensor, or a detecting circuit, and is configured to obtain a current capacitance value of a fingerprint sensor of a terminal at different stages. For example, the capacitance-value obtaining unit 31 can obtain the current capacitance value after a user touches the surface of the fingerprint sensor, or, it can obtain the current capacitance value of the fingerprint sensor when a preset time has elapsed after increasing the temperature of the fingerprint sensor. The capacitance-value obtaining unit 31 can obtain the current capacitance value at preset intervals or based on a certain event, such as a press or touch operation on the surface of the fingerprint sensor by the user.

The difference calculating unit 32 can be a calculator, a counter, or a calculating circuit, and is configured to calculate a difference between the current capacitance value and a preset capacitance reference value.

The foreign-material determining unit 33 can be a processor and is configured to determine that the foreign material is present on the surface of the fingerprint sensor, if the first difference is within a preset foreign-material threshold range.

As illustrated in FIG. 3, the apparatus may further include a foreign-material removal control unit 34, which can be implemented as a micro-controller or a logic control circuit. The foreign-material removal control unit 34 is generally configured to remove the foreign material in a preset manner.

As one implementation, the foreign-material removal control unit 34 may further include an alerting unit 35, which can be implemented as a transmitter, a sensor, an alarm system, and the like, and is configured to send a message indicating that the foreign material is on the surface of the fingerprint sensor, to prompt a user to remove the foreign material.

As another implementation, the foreign-material removal control unit 34 may further include a temperature controller 36, which is configured to increase a temperature of the fingerprint sensor, to remove the foreign material. For example, in order to increase the temperature of the fingerprint sensor the temperature controller can be configured to increase the power of the fingerprint sensor or can be configured to control a heating device corresponding to the fingerprint sensor to heat the fingerprint sensor.

The method for determining the existence of the foreign material of the terminal on the surface will be described in combination with the apparatus described above.

At the beginning, a current capacitance value of the fingerprint sensor of a terminal is obtained by the capacitance-value obtaining unit 31. Then a first difference between the current capacitance value and a preset capacitance reference value is calculated by the difference calculating unit 32. If the first difference is within a preset foreign-material threshold range, the foreign-material determining unit 33 determines that the foreign material is present on the surface of the fingerprint sensor. Otherwise, the foreign-material determining unit 33 determines the surface of the fingerprint sensor with no foreign material. Thereafter, the foreign material is removed in a preset manner via the foreign-material removal control unit 34.

The foreign material can be removed by increasing temperature by the temperature controller 36; in another implementation, the foreign material can be removed by informing the user to remove it, such as issue an alert by the alerting unit 35.

In case that the temperature of the fingerprint sensor is increased, the current capacitance value (that is, the second current capacitance value) of the fingerprint sensor of the terminal is obtained after a preset time has elapsed after increasing the temperature by the capacitance-value obtaining unit 31. Then a second difference between the second current capacitance value and the preset capacitance reference value is calculated by the difference calculating unit 32. Then determine that the foreign material is present on the surface of the fingerprint sensor by foreign-material determining unit 33 when the second difference is within the preset foreign-material threshold range. Thereafter, the alerting unit 35 will send the message indicating that the foreign material is present on the surface of the fingerprint sensor, so as to prompt the user to remove the foreign material based on a determination that the foreign material is present on the surface of the fingerprint sensor.

The foregoing functional units can be implemented by a processor invoking program codes stored in a memory, which will be described below in detail.

Fourth Implementation

Figure 4:
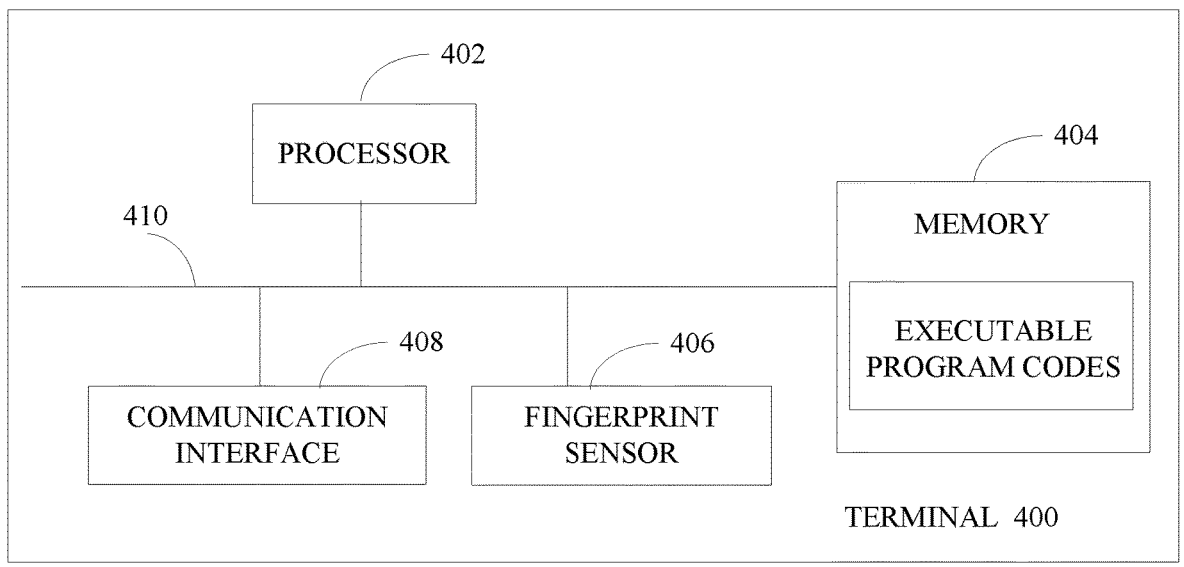
FIG. 4 is a schematic structural diagram illustrating a terminal according to a fourth implementation of the present disclosure.

FIG. 4 is a schematic structural diagram illustrating a terminal according to a fourth implementation of the present disclosure.

As illustrated in FIG. 4, a terminal 400 includes a processor 402, a memory 404, a fingerprint sensor 406, a communication interface 408, and a bus 410. The processor 402, the memory 404, the fingerprint sensor 406, and the communication interface 408 can be coupled and communicated via the bus 410.

The processor 402 may be one of a central processing unit (CPU), a micro-processor, an application-specific integrated circuit (ASIC), or one or more integrated circuits for controlling the programs for the implementation of above-mentioned technical solutions, and controls wireless communication with an external cellular network via the communication interface 408. The communication interface 408 includes, but is not limited to, an antenna, an amplifier, a transceiver, a coupler, a low noise amplifier (LNA), a duplexer and so on, and is configured to communicate with other devices or communication networks such as Ethernet, radio access network (RAN), wireless local area network (WLAN) and the like. The fingerprint sensor 406 is configured to acquire fingerprint data of a finger of a user. The memory 404 includes at least one of a random access memory (RAM), a non-volatile memory, and an external memory, the memory 404 is configured to store executable program codes that executes the above-mentioned technical schemes and is controlled by the processor 402. The executable program codes can guide the processor 402 to execute the method for determining the existence of the foreign material on the surface of the fingerprint sensor of the terminal disclosed in the method implementation with reference to FIG. 3 of the present disclosure. The memory 404 can exist independently and connect to the processor 402 via the bus 410. The memory 404 can also be integrated with the processor 402.

The memory 404 is configured to store program codes which when executed by the processor 402 become operational with the processor 402 to: obtain a current capacitance value of the fingerprint sensor of a terminal; calculate a first difference between the current capacitance value and a preset capacitance reference value; determine that the foreign material is present on the surface of the fingerprint sensor, when the first difference is within a preset foreign-material threshold range.

The processor 402 is further configured to: remove the foreign material in a preset manner.

The processor configured to remove the foreign material in a preset manner is configured to: send a message indicating that the foreign material is present on the surface of the fingerprint sensor, to prompt a user to remove the foreign material; and/or increase a temperature of the fingerprint sensor, to remove the foreign material.

In one implementation, the processor 402 configured to increase a temperature of the fingerprint sensor is configured to execute one of: increasing a power of the fingerprint sensor, to increase the temperature of the fingerprint sensor; controlling a heating device corresponding to the fingerprint sensor to heat the fingerprint sensor, to increase the temperature of the fingerprint sensor.

In another implementation, the processor 402 configured to increase a temperature of the fingerprint sensor is further configured to: obtain the current capacitance value of the fingerprint sensor of the terminal when a preset time has elapsed after increasing the temperature of the fingerprint sensor; calculate a second difference between the current capacitance value of the fingerprint sensor of the terminal and the preset capacitance reference value; determine that the foreign material is present on the surface of the fingerprint sensor when the second difference is within the preset foreign-material threshold range; send a message indicating that the foreign material is present on the surface of the fingerprint sensor, to prompt a user to remove the foreign material.

In still another implementation, the processor 402 is further configured to: set the preset foreign-material threshold range according to experimental data of capacitance change tests which are performed on the fingerprint sensor when different conductive foreign materials are present on the surface of the fingerprint sensor.

Fifth Implementation

Figure 5:
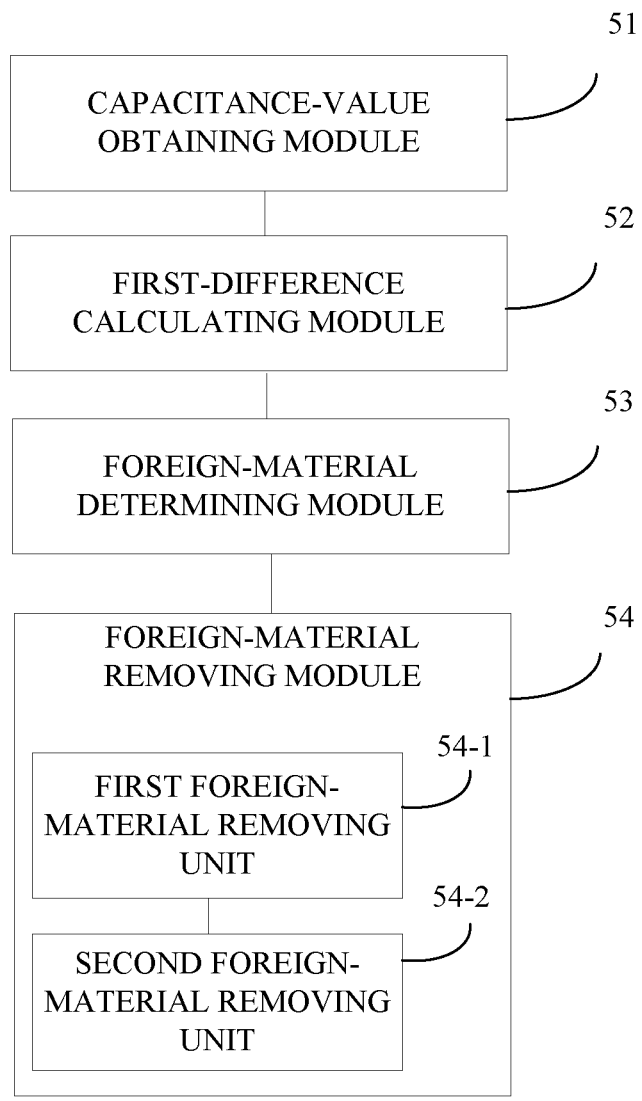
FIG. 5 is a schematic structural diagram illustrating an apparatus for determining existence of a foreign material on a surface of a fingerprint sensor of a terminal according to a fifth implementation of the present disclosure.

FIG. 5 is a schematic structural diagram illustrating an apparatus for determining existence of a foreign material on a surface of a fingerprint sensor of a terminal according to a fifth implementation of the present disclosure. As illustrated in FIG. 5, the apparatus of the fifth implementation includes a capacitance-value obtaining module 51, a first-difference calculating module 52, and a foreign-material determining module 53.

The capacitance-value obtaining module 51 is configured to obtain a current capacitance value of the fingerprint sensor of the terminal.

The first-difference calculating module 52 is configured to calculate a first difference between the current capacitance value and a preset capacitance reference value.

The foreign-material determining module 53 is configured to determine that the foreign material is present on the surface of the fingerprint sensor when the first difference is within a preset foreign-material threshold range.

The preset capacitance reference value is a capacitance value tested with no foreign material present on the surface of the fingerprint sensor before leaving the factory and is stored in a system in advance, where the preset foreign-material threshold range is set in advance according to experimental data of capacitance-change tests performed on the fingerprint sensor when different conductive foreign materials are present on the surface of the fingerprint sensor.

The apparatus further includes a foreign-material removing module 54, configured to remove the foreign material in a preset manner.

The foreign-material removing module 54 includes a first foreign-material removing unit 54-1, configured to increase a temperature of the fingerprint sensor to remove the foreign material.

The foreign-material removing module 54 further includes a second foreign-material removing unit 54-2, configured to send a message indicating that the foreign material is present on the surface of the fingerprint sensor to prompt a user to remove the foreign material.

The first foreign-material removing unit 54-1 is further configured to: obtain a current capacitance value of the fingerprint sensor of the terminal after increasing the temperature of the fingerprint sensor, when a preset time has elapsed, calculate a second difference between the current capacitance value obtained when the preset time has elapsed and the preset capacitance reference value, determine that the foreign material is present on the surface of the fingerprint sensor when the second difference is within the preset foreign-material threshold range, and send a message indicating that the foreign material is present on the surface of the fingerprint sensor to prompt a user to remove the foreign material based on a determination that the foreign material is present on the surface of the fingerprint sensor.

The first foreign-material removing unit 54-1 configured to increase the temperature of the fingerprint sensor is configured to: increase a power of the fingerprint sensor to increase the temperature of the fingerprint sensor, or control a heating device corresponding to the fingerprint sensor to heat the fingerprint sensor to increase the temperature of the fingerprint sensor.

It should be noted that, those of ordinary skill in the art may understand that all or part of the steps in the methods of the foregoing implementations may be implemented by a program instructing relevant hardware. The program may be stored in a computer-readable storage medium such as the memory of the terminal and executed by at least one processor of the terminal. When executed, the program may include procedures of the implementations such as the method for determining the existence of the foreign material on the surface of the fingerprint sensor of the terminal. The storage medium includes but is not limited to a Read Only Memory (ROM), a Random Access Memory (RAM), a magnetic disk, an optical disk, or the like.

Note that the above are exemplary implementations of the present disclosure and the applied technical principles. Those skilled in the art should understand that the present disclosure is not limited to the specific implementations described herein, and various changes, modifications, and substitutions can be made by those skilled in the art without departing from the scope of the present disclosure. Although has been described in detail by way of implementations, the present disclosure is not limited to the above implementations and other equivalent implementations may be obtained without departing from the present disclosure. The scope of the present disclosure should be determined by the appended claims.

What is claimed is:

1. A method for determining existence of a foreign material on a surface of a fingerprint sensor of a terminal, comprising:
   obtaining a current capacitance value of the fingerprint sensor of the terminal;
   calculating a first difference between the current capacitance value and a preset capacitance reference value;
   determining that the foreign material is present on the surface of the fingerprint sensor when the first difference is within a preset foreign-material threshold range;
   increasing a temperature of the fingerprint sensor at a step-changed rate to remove the foreign material, wherein the step-changed rate is different from a constant rate; and
   sending a message with a text prompt message and a sound prompt message indicating that the foreign material is present on the surface of the fingerprint sensor to prompt a user to remove the foreign material,
   wherein the preset capacitance reference value is a capacitance value tested with no foreign material present on the surface of the fingerprint sensor before leaving the factory and is stored in a system in advance; wherein the preset foreign-material threshold range is set in advance according to experimental data of capacitance-change tests performed on the fingerprint sensor when different conductive foreign materials are present on the surface of the fingerprint sensor and the preset foreign-material threshold range is determined according to different foreign materials on the surface of the fingerprint sensor in actual use.

2. The method of claim 1, wherein the method further comprises the following after the increasing a temperature of the fingerprint sensor at a step-changed rate:
   obtaining a current capacitance value of the fingerprint sensor of the terminal when a preset time has elapsed;
   calculating a second difference between the current capacitance value obtained when the preset time has elapsed and the preset capacitance reference value;
   determining that the foreign material is present on the surface of the fingerprint sensor when the second difference is within the preset foreign-material threshold range; and
   sending a message indicating that the foreign material is present on the surface of the fingerprint sensor to prompt a user to remove the foreign material based on a determination that the foreign material is present on the surface of the fingerprint sensor.

3. The method of claim 2, wherein the increasing a temperature of the fingerprint sensor at a step-changed rate comprises:
   increasing a power of the fingerprint sensor to increase the temperature of the fingerprint sensor at the step-changed rate; or controlling a heating device corresponding to the fingerprint sensor to heat the fingerprint sensor to increase the temperature of the fingerprint sensor at the step-changed rate.

4. The method of claim 1, wherein the increasing a temperature of the fingerprint sensor at a step-changed rate comprises:
increasing a power of the fingerprint sensor to increase the temperature of the fingerprint sensor at the step-changed rate; or
controlling a heating device corresponding to the fingerprint sensor to heat the fingerprint sensor to increase the temperature of the fingerprint sensor at the step-changed rate.

5. An apparatus for determining existence of a foreign material on a surface of a fingerprint sensor of a terminal, comprising:
a capacitance-value obtaining module, configured to obtain a current capacitance value of the fingerprint sensor of the terminal;
a first-difference calculating module, configured to calculate a first difference between the current capacitance value and a preset capacitance reference value;
a foreign-material determining module, configured to determine that the foreign material is present on the surface of the fingerprint sensor when the first difference is within a preset foreign-material threshold range; and
a foreign-material removing module, configured to remove the foreign material in a preset manner; the foreign-material removing module comprising:
a first foreign-material removing unit configured to increase a temperature of the fingerprint sensor at a step-changed rate to remove the foreign material, wherein the step-changed rate is different from a constant rate; and
a second foreign-material removing unit configured to send a message with a text prompt message and a sound prompt message indicating that the foreign material is present on the surface of the fingerprint sensor to prompt a user to remove the foreign material;
wherein the preset capacitance reference value is a capacitance value tested with no foreign material present on the surface of the fingerprint sensor before leaving the factory and is stored in a system in advance; wherein the preset foreign-material threshold range is set in advance according to experimental data of capacitance-change tests performed on the fingerprint sensor when different conductive foreign materials are present on the surface of the fingerprint sensor and the preset foreign-material threshold range is determined according to different foreign materials on the surface of the fingerprint sensor in actual use.

6. The apparatus of claim 5, wherein the first foreign-material removing unit is further configured to:
obtain a current capacitance value of the fingerprint sensor of the terminal after increasing the temperature of the fingerprint sensor, when a preset time has elapsed;
calculate a second difference between the current capacitance value obtained when the preset time has elapsed and the preset capacitance reference value;
determine that the foreign material is present on the surface of the fingerprint sensor when the second difference is within the preset foreign-material threshold range; and
send a message indicating that the foreign material is present on the surface of the fingerprint sensor to prompt a user to remove the foreign material based on a determination that the foreign material is present on the surface of the fingerprint sensor.

7. The apparatus of claim 6, wherein the first foreign-material removing unit configured to increase the temperature of the fingerprint sensor at a step-changed rate is configured to:
increase a power of the fingerprint sensor to increase the temperature of the fingerprint sensor at the step-changed rate; or
control a heating device corresponding to the fingerprint sensor to heat the fingerprint sensor to increase the temperature of the fingerprint sensor at the step-changed rate.

8. The apparatus of claim 5, wherein the first foreign-material removing unit configured to increase the temperature of the fingerprint sensor at a step-changed rate is configured to:
increase a power of the fingerprint sensor to increase the temperature of the fingerprint sensor at the step-changed rate; or
control a heating device corresponding to the fingerprint sensor to heat the fingerprint sensor to increase the temperature of the fingerprint sensor at the step-changed rate.

* * * * *